United States Patent
Sacken et al.

(10) Patent No.: US 10,464,535 B2
(45) Date of Patent: Nov. 5, 2019

(54) CURVED OUTRIGGER HAVING A FOLDING PART

(71) Applicant: Schwing GmbH, Herne (DE)

(72) Inventors: Christoph Sacken, Haltern am See (DE); Bernd Segschneider, Dortmund (DE)

(73) Assignee: Schwing GmbH, Herne (DE)

( * ) Notice: Subject to any disclaimer, the term of this patent is extended or adjusted under 35 U.S.C. 154(b) by 0 days.

(21) Appl. No.: 16/140,944

(22) Filed: Sep. 25, 2018

(65) Prior Publication Data

US 2019/0092288 A1    Mar. 28, 2019

(30) Foreign Application Priority Data

Sep. 26, 2017   (DE) .......................... 10 2017 122 343

(51) Int. Cl.
| | |
|---|---|
| *B60S 9/00* | (2006.01) |
| *B60S 9/02* | (2006.01) |
| *B66C 23/80* | (2006.01) |
| *B60S 9/10* | (2006.01) |
| *B60S 9/12* | (2006.01) |

(52) U.S. Cl.
CPC . *B60S 9/02* (2013.01); *B60S 9/10* (2013.01); *B60S 9/12* (2013.01); *B66C 23/80* (2013.01)

(58) Field of Classification Search
CPC ...... B60S 9/02; B60S 9/10; B60S 9/12; B66C 23/78; B66C 23/80
See application file for complete search history.

(56) References Cited

U.S. PATENT DOCUMENTS

| | | | |
|---|---|---|---|
| 3,825,095 A * | 7/1974 | Clark ...................... | B66F 11/04 182/17 |
| 4,071,147 A * | 1/1978 | Hornagold ............. | B66C 23/80 212/304 |

(Continued)

FOREIGN PATENT DOCUMENTS

| | | |
|---|---|---|
| DE | 3830315 A1 | 3/1990 |
| DE | 19736109 A1 | 2/1999 |

(Continued)

*Primary Examiner* — Hau V Phan
(74) *Attorney, Agent, or Firm* — Faegre Baker Daniels LLP

(57) ABSTRACT

The invention relates to a vehicle (1), in particular a truck-mounted concrete pump, having a pivotable turntable (3), arranged on a frame (2), with a boom (4) constructed thereon, and a frame outrigger (5) which has carriers (6, 6*a*) that are retractable into the vehicle profile and/or extendable out of the vehicle profile, wherein the carriers (6, 6*a*) are each guided on an extension portion (7, 7*a*) fixed to the vehicle and form a telescope (8, 8*a*) therewith, wherein the extension portions (7, 7*a*) fixed to the vehicle are arranged behind a cab (9) in the direction of travel, wherein a folding part (11, 11*a*) connected via a joint (10, 10*a*) is arranged in each case at a free end of the carriers (6, 6*a*), wherein a support leg (12, 12*a*) is arranged on each folding part (11, 11 a), wherein the joint (10, 10*a*) is arranged outside the respective extension portion (7, 7*a*) in the retracted transport position of the carriers (6, 6*a*), such that the folding part (11, 11*a*) is foldable laterally into the vehicle profile in a transport folded position, wherein the folding part (11, 11*a*) is foldable forward in the direction of the cab (9) in the transport folded position.

10 Claims, 9 Drawing Sheets

(56) References Cited

U.S. PATENT DOCUMENTS

| | | | | |
|---|---|---|---|---|
| 4,394,912 A | * | 7/1983 | Epps | B66C 23/78 |
| | | | | 212/303 |
| 4,609,204 A | | 9/1986 | Nekola | |
| 5,387,071 A | * | 2/1995 | Pinkston | B60P 3/125 |
| | | | | 212/232 |
| 6,276,818 B1 | * | 8/2001 | Wang | E05B 17/0025 |
| | | | | 292/5 |
| 7,594,679 B1 | * | 9/2009 | Schneider | B66C 23/80 |
| | | | | 280/763.1 |
| 8,366,148 B2 | * | 2/2013 | Benz | B62D 21/186 |
| | | | | 280/763.1 |
| 2006/0267326 A1 | * | 11/2006 | Richard | B66C 23/78 |
| | | | | 280/763.1 |
| 2015/0030383 A1 | * | 1/2015 | Ukezeki | B60S 9/22 |
| | | | | 403/316 |
| 2017/0050825 A1 | * | 2/2017 | Oleksyuk | B66C 23/78 |

FOREIGN PATENT DOCUMENTS

| | | | |
|---|---|---|---|
| EP | 1003655 | B1 | 6/2003 |
| JP | 56013243 | A | 2/1981 |

* cited by examiner

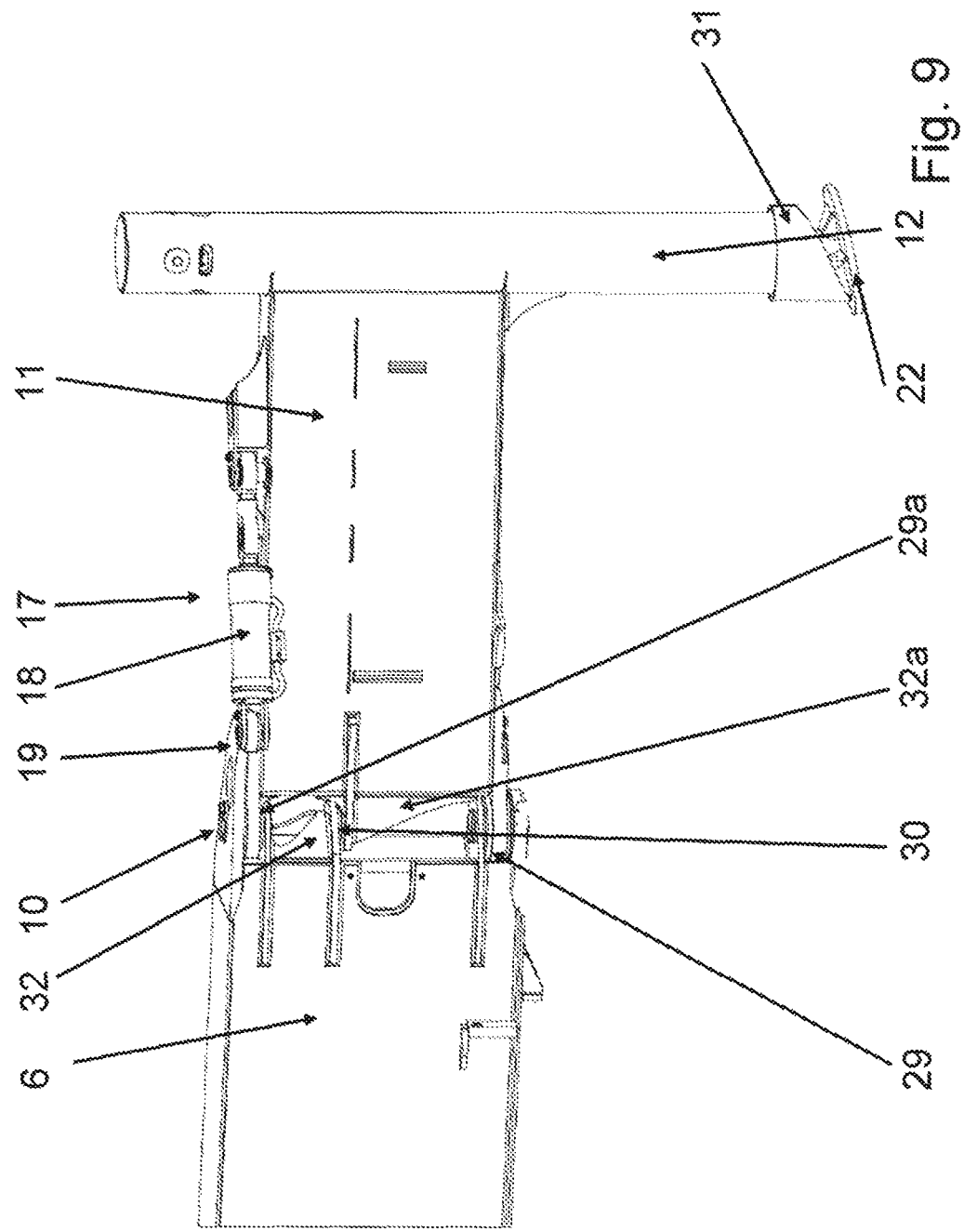

_US 10,464,535 B2_

CURVED OUTRIGGER HAVING A FOLDING PART

CROSS-REFERENCE TO RELATED APPLICATION

This application claims priority to Germany Patent Application No. 10 2017 122 343.6, filed Sep. 26, 2017, which is herein incorporated by reference in its entirety.

The invention relates to a vehicle, in particular a truck-mounted concrete pump, having a pivotable turntable, arranged on a frame, with a boom constructed thereon, and a frame outrigger which has carriers that are retractable into the vehicle profile and/or extendable out of the vehicle profile, wherein the carriers are each guided on an extension portion fixed to the vehicle and form a telescope therewith, wherein the extension portions fixed to the vehicle are arranged behind a cab in the direction of travel, wherein a folding part connected via a joint is arranged in each case at a free end of the carriers, wherein a support leg is arranged on each folding part, wherein the joint is arranged outside the respective extension portion in the retracted transport position of the carriers, such that the folding part is foldable laterally into the vehicle profile in a transport folded position.

Such a vehicle is known from EP 1 003 655 B1. Such vehicles are provided as road vehicles for various purposes. The invention relates in particular to vehicles with a concrete pump constructed thereon, wherein the boom serves as a distributor boom, which carries a concrete delivery line in order to distribute the concrete delivered by the concrete pump. As a rule, capable vehicles of the type in question here have to be provided with far-reaching booms. In the case of mobile truck-mounted concrete pumps, the necessary range of the boom requires that the latter be subdivided into boom segments with articulated joints which allow the boom to be folded up for driving operation. Such booms reach considerable heights and bring about a tilting moment that is dependent on the reach and the length of the boom. The frame outrigger transfers the tilting moment to the standing surface of the vehicle and as a result prevents the vehicle with the boom from toppling over. The development of such vehicles is based on the need to provide constantly increasing boom lengths and ranges on account of increasing demands, but to maintain the vehicle profile for driving operation. In mobile truck-mounted concrete pumps, it is in this regard a matter of not exceeding the permissible vehicle width, in order to avoid restrictions for abnormal loads, which are demanded in the case of abnormally wide vehicles. The frame outrigger takes place as a rule on four support points, in particular when the turntable of the boom allows an unlimited pivot angle. For the support, the problem often then arises that, for tilting moments, smaller problems arise in the main about the transverse axis of the vehicle than when tilting moments are supported about the vehicle longitudinal axis. However, since in most cases the pivotability of the boom in the turntable cannot be restricted to tilting moments about the transverse axis, at corresponding boom lengths, long carriers are necessary for support, this being associated with the difficulty of accommodating said carriers in the vehicle profile for driving operation. In the transport position, the extension portions and the carriers arranged in a telescopic manner therein have to remain within the two lateral boundaries of the vehicle profile for driving operation. As a result, the length of the extension portions and of the carriers is limited.

The invention proceeds from a previously known vehicle, on the chassis of which a concrete pump and a distributor boom are constructed, the turntable of which, as is conventional in such vehicles, is constructed in the immediate vicinity of the cab on the chassis or an auxiliary frame of the chassis, while the filling hopper of the concrete pump is located at the vehicle rear and parts of the concrete delivery device are arranged in vehicle middle. In this vehicle, four carriers are provided for the four-point frame outrigger. The front frame outrigger has extension portions fixed to the vehicle, the carriers being arranged in said extension portions such that they form a telescope by way of which the carriers are retractable into the vehicle profile or extendable out of the vehicle profile. Folding parts that are connected via a joint are arranged at the free ends of the carriers, wherein a support leg is arranged on each of the folding parts. In order to arrange the folding part with the support leg arranged thereon within the two lateral boundaries of the vehicle profile for driving operation, the folding part can be folded rearward laterally into the vehicle profile into a transport folded position with the carriers in the retracted transport position. Not only does this shorten the possible length of the extension portions and thus also of the carriers, but also the lateral rearward folding limits the possible length of rear carriers. As a rule, two rear carriers are foldable laterally out of the vehicle profile via a joint. The arrangement of this joint has to be shifted to the rear in the previously known vehicle, in order that there is enough space for the folding part folded up in the transport folded position and the support leg arranged thereon. As a result, the maximum possible length of the rear carriers would be limited under certain circumstances and the available installation space for the control elements of the machine hydraulics and electronics would be greatly limited. Therefore, the previously known vehicle is not suitable for booms with great lengths and reaches and for turntables that are rotatable in an unlimited manner. Furthermore, complicated drives are required for the rearward folding movement in the transport folded position on account of the large pivoting range of the folding part on the carrier.

Therefore, it is the object of the invention to provide a vehicle of the abovementioned type, which meets the increased requirements placed on the range of booms without introducing impairments in other respects. In particular, the supporting width of the frame outrigger is intended to be increased.

This object is achieved by a vehicle having the features of claim 1.

Since the folding part is foldable forward in the direction of the cab in the transport folded position, the supporting width of the frame outrigger can be increased without the (preferably arcuate) carrier projecting laterally beyond the vehicle profile in the transport position for driving operation or the folding part attached to said carrier in an articulated manner projecting laterally beyond the vehicle profile in the transport folded position for driving operation. The folding movement of the folding part forward in the direction of the cab in the transport folded position not only allows sufficient installation space for the control elements of the machine hydraulics and electronics but also allows sufficiently long rear folding carriers to be attached in an articulated manner, such that a large supporting width of the frame outrigger can be achieved in this way, too.

Advantageous configurations and developments of the invention are apparent from the dependent claims. It should be noted that the features listed individually in the claims can also be combined with one another in any desired and technologically appropriate manner and thus indicate further configurations of the invention.

According to one advantageous configuration of the invention, the vehicle has two or more front axles, located very close together, between the cab and extension portion, wherein the support legs arranged on the respective folding part are arranged between two axles within the vehicle profile in the transport folded position. The arrangement of the support legs between the axles in the transport folded position has the advantage that sufficient space is available here for accommodating the support legs in the vehicle profile for driving operation. Therefore, support plates, arranged on the support legs, for ground contact do not have to be removed even for driving operation. As a result of the support legs being arranged between the axles, for example of a double steering axle, the vehicle also no longer has to be modified in a complicated manner, for example by increasing the axle spacing of the axles.

The embodiment in which the folding part is pivotable out of the transport folded position into a supporting folded position before the carrier is extendable from the retracted transport position into an extended supporting position is particularly advantageous. As a result of the folding part being pivoted into the supporting folded position, it can be folded excellently out of the vehicle profile. In particular when the support leg is located between the axles of the double steering axle of the vehicle in the transport folded position, it is possible, as a result of previously folding the folding part out of the transport folded position into the supporting folded position, to advance the support leg between the wheels virtually perpendicularly to the vehicle longitudinal axis, before the carrier is pulled or pushed out of the transport position in the extension portion. As a result, a particularly space-saving arrangement of the folding part with the support leg arranged thereon between two axles within the vehicle profile in the transport folded position is possible.

In a particularly advantageous embodiment of the invention, the folding part is latchable in the transport folded position and/or in the supporting folded position. With a possibility of latching the folding part, it is possible to ensure that the latter maintains the desired position with respect to the carrier. As a result, in the transport folded position, it is possible to ensure that the folding part does not fold out of the vehicle profile while traveling. In the supporting folded position, it is possible to ensure by way of the latching that the frame outrigger reliably supports the vehicle. The latching mechanism can be formed, inter alia, by a pin or a rod, which secures the position of the folding part with respect to the carrier.

According to one configuration, it is particularly advantageous when the extension portions each have a collar, wherein the latter extends toward the vehicle middle, in particular at an angle of up to 20 degrees, preferably 15 degrees, in the direction of the cab with respect to the vehicle profile, such that, on a side facing the cab, the collar is offset from the vehicle profile in the direction of the vehicle middle at least by the width of the folding part, but as far as possible not by much more than this width. The angle of the collar with respect to the vehicle longitudinal direction should be as small as possible and the collar should be guided as close as possible to the outer profile edge of the vehicle profile. As a result of this measure, the extension length, acting as a lever arm on the collar, of the carrier can be kept as small as possible, with the result that the forces acting on the collar become as small as possible and the collar can be dimensioned to be as light as possible. Moreover, the force transmission between the carrier and collar during supporting is optimized by this measure. To this end, on the side facing the cab, the collar is offset from the vehicle profile in the direction of the vehicle middle by at most the width of the folding part, while, on the side facing away from the cab, the collar is guided as far as the outer profile edge of the vehicle profile. With an angle of at most 20 degrees, preferably 15 degrees, with respect to the vehicle longitudinal direction, the collar can be guided up as close as possible to the outer profile edge of the vehicle profile, wherein the extension portion formed in this way affords sufficient space in order that, in the retracted transport position of the carriers, the joint is arranged outside the respective extension portion, such that the folding part is foldable laterally forward into the vehicle profile in the transport folded position.

In a further advantageous embodiment, the folding part is pivotable with respect to the carrier from the transport folded position into the supporting folded position in each case by means of a drive. Such a drive makes it easier to pivot the folding part into the desired position and makes automatic positioning of the support legs possible. The drive can be in the form of a rotary drive or of a linear, preferably hydraulic drive, wherein said drive can drive the folding part with respect to the carrier directly or via a lever mechanism.

An embodiment in which the drive is configured to keep the folding part in the transport folded position and/or in the supporting folded position is particularly advantageous. With such a configuration of the drive, it is possible to ensure, in the transport folded position, that the folding part does not fold out of the vehicle profile while traveling. In the supporting folded position, the drive can ensure that the frame outrigger reliably supports the vehicle.

In a particular advantageous embodiment of the invention, the drive comprises a hydraulic cylinder, wherein a lug for attaching the hydraulic cylinder in an articulated manner is formed at the free end of the carrier. This articulated attachment allows a sufficiently large lever arm in order to pivot the folding part with respect to the carrier with the hydraulic cylinder reliably from the transport folded position into the supporting folded position and back into the transport folded position.

According to one embodiment, it is particularly advantageous when, in the transport position of the carrier, the lug passes around the respective collar of the extension portion in the direction of the vehicle middle. In this way, the axis of rotation for the hydraulic cylinder can be positioned as far as possible toward the vehicle middle in order to make sufficient installation length and lever arm for the hydraulic cylinder available even in the transport folded position.

According to a particularly advantageous configuration of the invention, the folding part is constructed in a telescopic manner. Since the folding parts themselves are constructed in a telescopic manner and thus form, together with the extension portions and the carriers, two telescopes connected via the joint, longer booms can be realized, since the frame outrigger reaches further, without the carriers projecting beyond the permissible vehicle profile during driving operation. Furthermore, the position of the support legs between the axles in the transport folded position is settable easily via the telescopic folding part, thereby making the construction more flexible.

Further features, details and advantages of the invention can be gathered from the following description and with reference to the drawings. An exemplary embodiment of the invention is illustrated purely schematically in the following drawings and is described in more detail in the following text. Mutually corresponding items are provided with the same reference signs in all the figures, in which:

FIG. 9 shows a carrier with a folding part.

Figure 1:
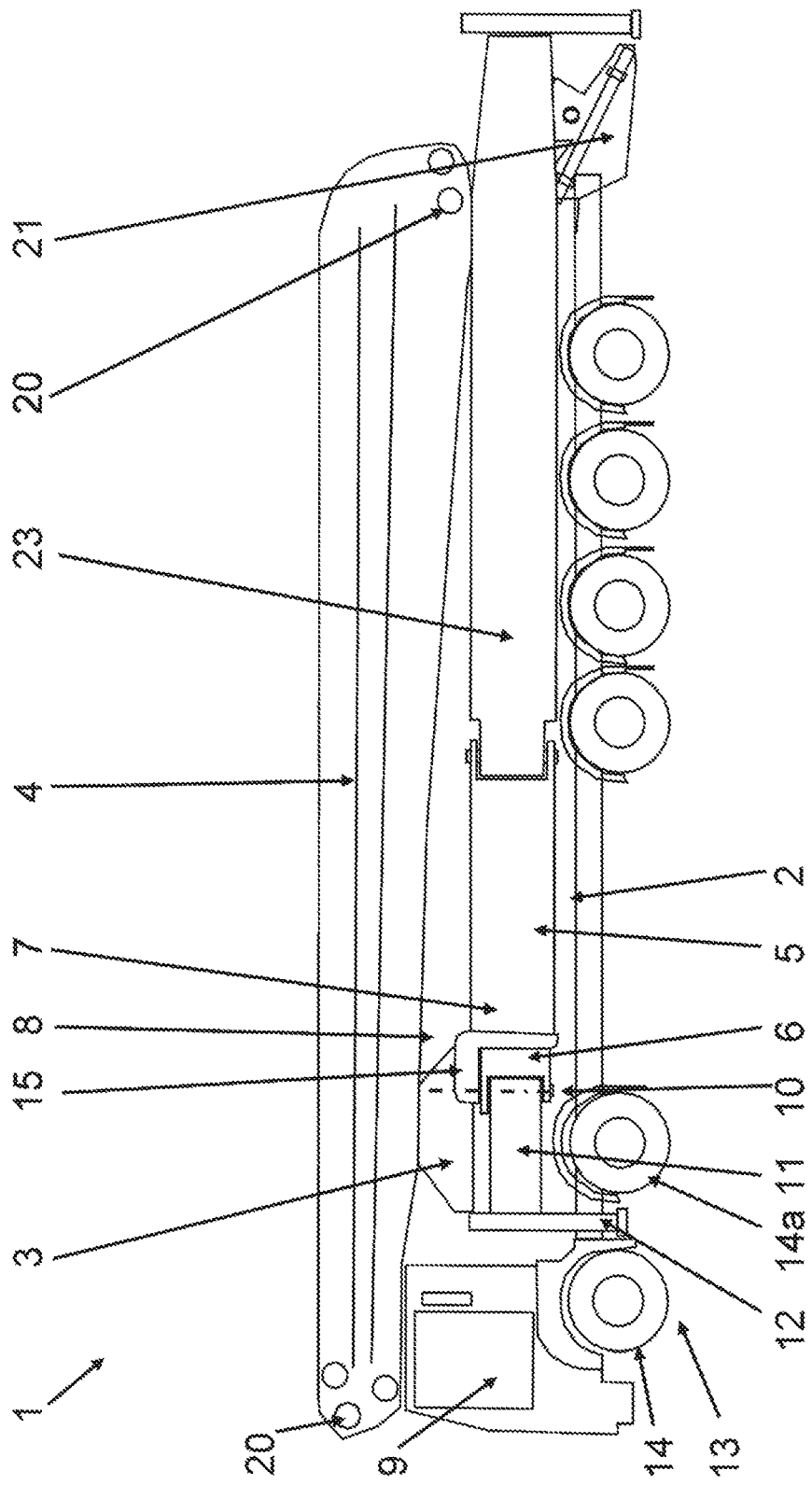
FIG. 1 shows a side view of a vehicle according to the invention.

Illustrated purely schematically in the figures, denoted by the reference sign 1, is a vehicle 1 according to the invention. The illustrated vehicle 1 is in the form of a truck-mounted concrete pump. Arranged on the frame 2 of the vehicle 1 is a pivotable turntable 3, on which a multi-section boom 4 is constructed. In the illustrated drawing, the segments of the boom 4 are folded together via joints 20 for driving operation. After the boom 4 has been unfolded, it serves to distribute concrete at a building site. The concrete is to this end introduced via a charging hopper 21 arranged at the rear and is delivered via a concrete pump into delivery lines (not illustrated) on the boom 4, in order to be able to be distributed via an end hose (not illustrated) arranged at the boom tip of the unfolded boom 4. The unfolded boom 4 reaches considerable heights and brings about a tilting moment that is dependent on the reach and the length of the boom 4. The frame outrigger 5, which is connected to the frame 2, transfers the tilting moment to the standing surface of the vehicle 1 and as a result prevents the vehicle with the boom 4 from toppling over when the boom 4 is unfolded and when the concrete is distributed. To this end, the frame outrigger 5 has horizontal carriers 6, 6*a* that are extendable out of the vehicle profile. In order for it to be possible to move the vehicle 1 during driving operation without restrictions for abnormal loads on public roads, the carriers 6, 6*a*, of mirror-inverted identical design, of the frame outrigger 5 are retracted into the vehicle profile. To this end, the carriers 6, 6*a* are each guided on an extension portion 7, 7*a* fixed to the vehicle. Thus, with the extension portions 7, 7*a*, the carriers 6, 6*a* each form a telescope 8, 8*a*. It is clearly apparent from FIG. 1 that the extension portions 7, 7*a* fixed to the vehicle are arranged behind a cab 9 in the direction of travel. At each free end of the carriers 6, 6*a*, a folding part 11, 11*a* connected to the carrier 6, 6*a* via a joint 10, 10*a* is arranged. Arranged on the folding part 11, 11*a* is a support leg 12, 12*a*, which preferably has a vertically telescopic support foot 22, 22*a* with a support plate. Via the support foot 22, 22*a* telescoped into contact with the underlying surface, the frame outrigger 5 can be supported on the underlying surface. In the illustration shown here, the carrier 6, 6*a* is located in the retracted transport position. In this position of the carrier 6, 6*a*, the joint 10, 10*a* is arranged outside the extension portion 7, 7*a* such that the folding part 11, 11*a* is folded laterally into the vehicle profile into a shown transport folded position. In the process, the folding part 11, 11*a* is folded forward in the direction of the cab 9. As a result of the folding of the folding part 11, 11*a* forward in the direction of travel of the vehicle 1, the folding part 11, 11*a* is located within the lateral vehicle profile in the illustrated transport folded position for driving operation. The joint 10, 10*a* for this folding mechanism forms a vertical pivot axis, which is indicated by a dot-dash line, and is arranged at the free end of the shown carrier 6, 6*a* and thus connects the folding part 11, 11*a* to the carrier 6, 6*a*. In the shown transport folded position of the folding part 11, 11*a*, the support leg 12, 12*a* is located between the axles 14, 14*a* of the double steering axle 13, which is located between the cab 9 and the extension portion 7, 7*a* in the direction of travel. The folding part 11, 11*a* can be pivoted laterally out of this transport folded position before the carrier 6, 6*a* is extendable from the transport position illustrated here into an extended supporting position. The installation space for the control electronics/hydraulics 33 is not impaired by the forwardly folded folding part. Depending on the machine configuration/variant, a tank, toolbox or the like, for example, could also be accommodated in this region.

Figure 2:
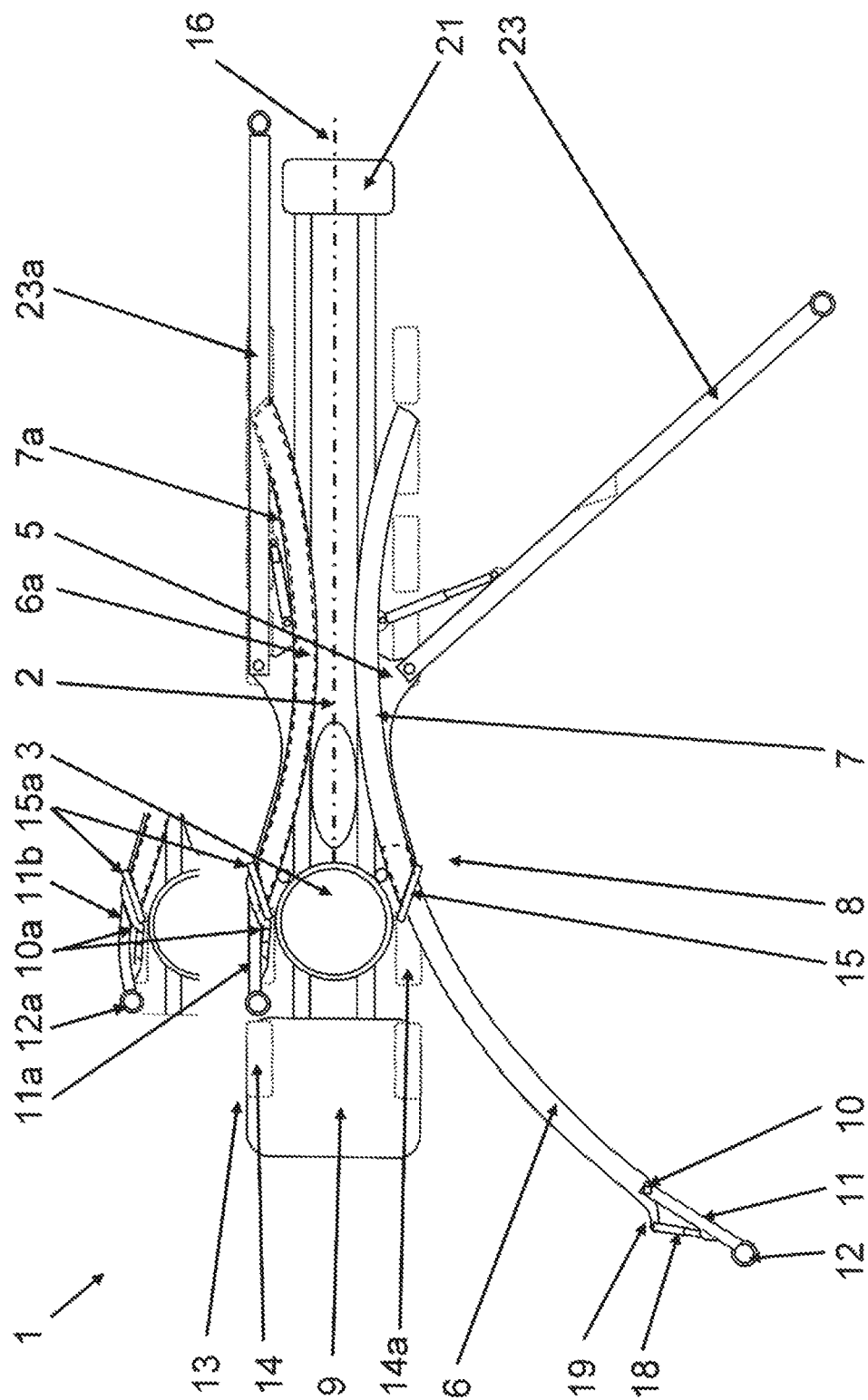
FIG. 2 shows a bird's-eye view of a vehicle according to the invention.

FIG. 2 shows a bird's-eye view of the vehicle 1 according to FIG. 1. On the left-hand side in the direction of travel, the arcuate carrier 6 is illustrated in a manner extended out of the extension portion 7. The folding part 11 connected to the carrier 6 via the joint 10 has been folded out into the supporting folded position. On the right-hand side in the direction of travel, the arcuate carrier 6*a* is retracted into the transport position in the extension portion 7*a* and the folding part 11*a* connected to the carrier 6*a* via the joint 10*a* has been folded forward in the direction of the cab 9 into the transport folded position, such that the folding part 10*a* is located laterally in the vehicle profile. Illustrated as a detail in FIG. 2 is an embodiment in which the folding part 11*b* is formed in a manner curved from the joint 10*a* in the direction of the vehicle middle 16; a bent embodiment would be possible, for example. As a result of this configuration, the support leg 12*a* can be folded even further into the vehicle profile in the transport folded position, such that larger support feet 22, 22*a* can be used, without the latter projecting laterally beyond the vehicle profile. As can be seen, the support leg 12, 12*a* arranged on the folding part 11, 11*a* is located between the axles 14, 14*a* of the double steering axle 13 in the shown transport folded position. From this position, the folding part 11*a* can first of all be pivoted into the supporting folded position, before the carrier 6*a* is extended out of the extension portion 7*a*. As a result, collisions with the axles 14, 14*a* are prevented. As already mentioned above, the carrier on the left in the direction of travel is illustrated in a supporting position extended out of the extension portion 7. The folding part 11 has been pivoted into the supporting folded position by a drive 17, which is in the form of a hydraulic cylinder 18 in the exemplary embodiment shown here. This drive 18 is configured to keep the folding part 11 in the selected supporting folded position. The hydraulic cylinder 18 of the drive is attached in an articulated manner to a lug 19, which is located at the free end of the carrier 6. As a result of the configuration of the lug 19, the hydraulic cylinder 18 has a sufficient lever arm in order to pivot the folding part 11 about the joint 10 with respect to the carrier 6. It is also apparent from FIG. 2 that the two extension portions 7, 7*a* each have a collar 15, 15*a*. This collar 15, 15*a* extends in an inclined manner toward the vehicle middle 16 in the direction of the cab 9 with respect to the vehicle profile, such that, on its side 28 facing the cab 9, the collar 15, 15*a* is offset from the vehicle profile in the direction of the vehicle middle 16 substantially by the width b of the folding part 11, 11*a*. In the exemplary embodiment shown, the collar 15, 15*a* extends toward the vehicle middle 16 in the direction of the cab 9 at an angle of preferably 15 degrees with respect to the vehicle longitudinal axis. As a result, it is easier to fold the folding part 11 forward into the transport folded position. It is also apparent from FIG. 2 that rear folding carriers 23, 23*a* for supporting the vehicle 1 are attached in an articulated manner behind the collars 15, 15*a* in the direction of travel, wherein the carrier 23 on the left-hand side in the direction of travel is illustrated in a folded-out manner in the supporting position, while the folding carrier 23a on the right-hand side in the direction of travel is illustrated in a manner folded laterally into the vehicle profile in the transport position.

Figure 3:
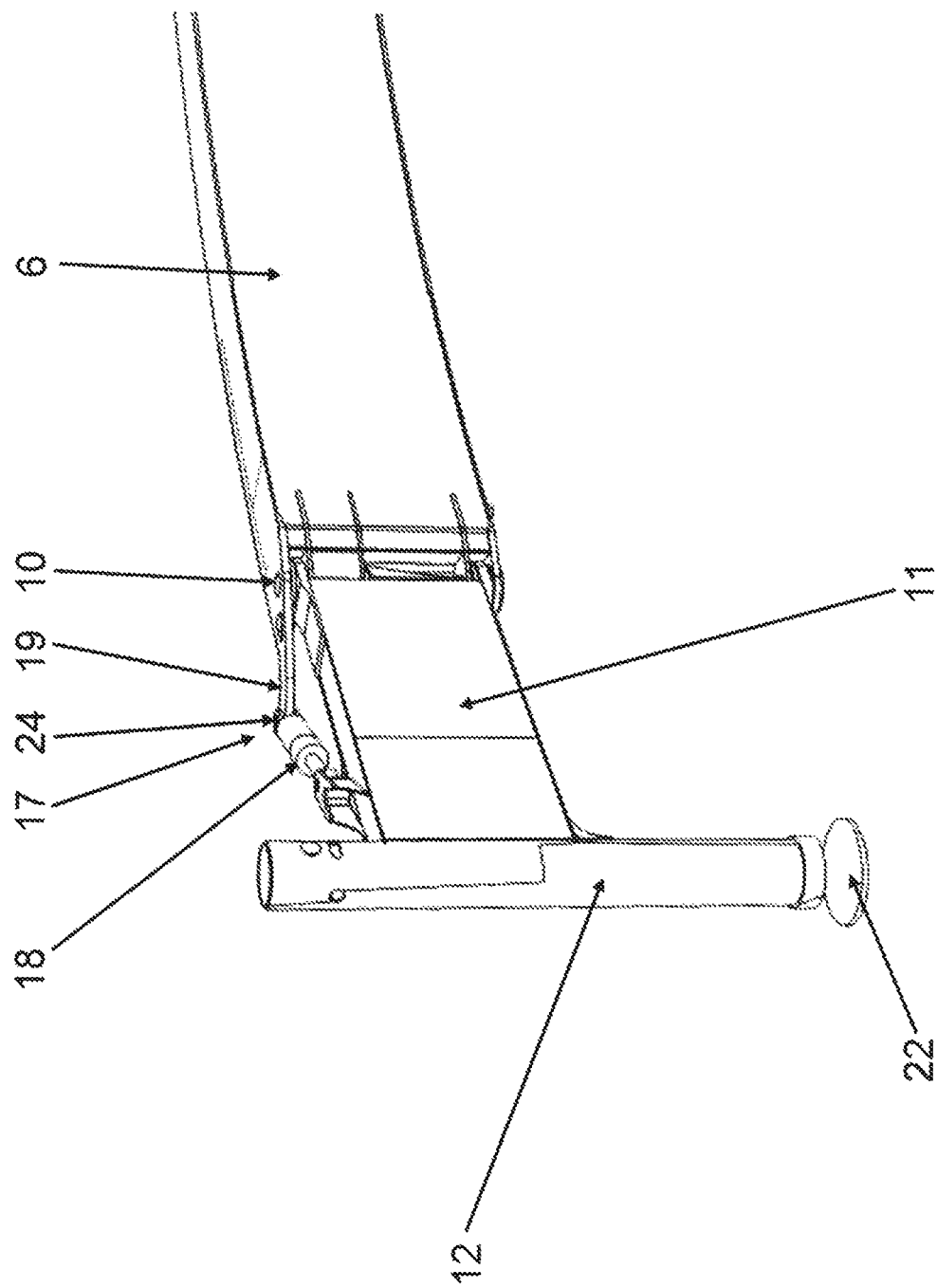
FIG. 3 shows a carrier with a folding part.

FIG. 3 shows a perspective detail view of the carrier 6 and of the folding part 11 connected via the joint 10. The carrier 6 shown here has been extended out of the extension portion 7 and the folding part 11 is located in a supporting folded position. The folding part 11 was pivoted into this supporting folded position by means of a drive 17, which is formed by a hydraulic cylinder 18. This hydraulic cylinder 18 is attached in an articulated manner to a lug 19 which is located at the free end of the carrier 6. As a result, the hydraulic cylinder 18 has a sufficient lever arm in order to pivot the folding part 11 horizontally about the joint 10 with respect to the carrier 6. The folding part 11 is held in the illustrated supporting folded position by the hydraulic cylinder 18, for example by a hydraulic lock with nonreturn valves, such that its position does not change with respect to the carrier 6. In order to always achieve the maximum lateral supporting width, the angular position of the folding part can be checked by a suitable sensor system (angle measurement, limit switch or the like) on the hydraulic cylinder 18 or on the joint 10, in order to ensure that the folding part 11 is fully extended. With the hydraulic cylinder 18, the folding part 11 can optionally be brought in a flexible manner into different support folded positions, in order to adapt the support to the conditions on the building site. The locking of the folding part 11 with respect to the carrier 6 takes place preferably only via the hydraulic cylinder 18.

Figure 4:
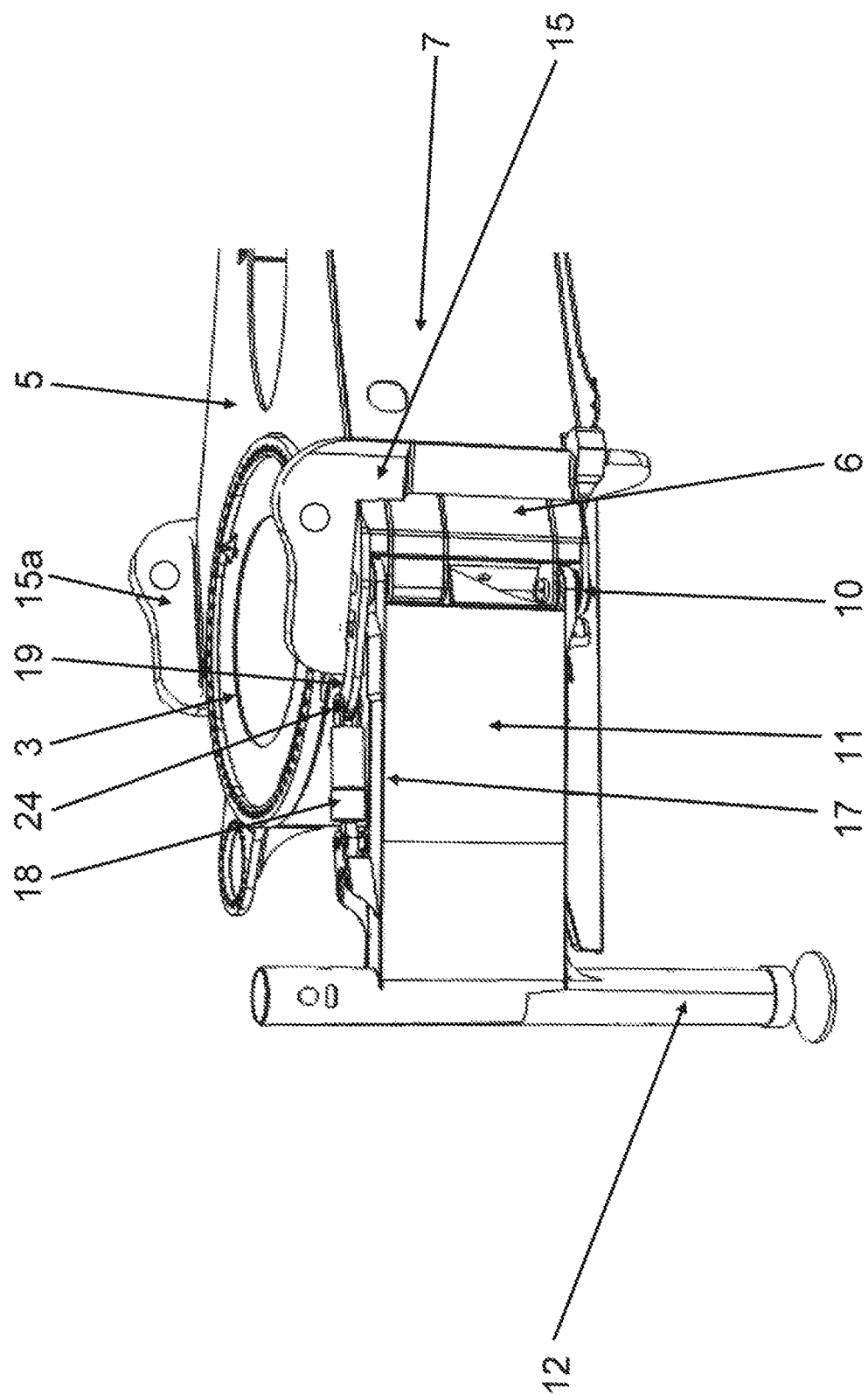
FIG. 4 shows the frame outrigger and folding part.

FIG. 4 shows a perspective detail view of the frame outrigger 5 and of the folding part 11. The carrier 6 shown here is located in the transport position and has been retracted into the extension portion 7. As can be seen, the joint 10, which connects the folding part 11 to the carrier 6, is located outside the extension portion 7 in this position. For this reason, the folding part 11 can be folded into the shown transport folded position. This is also rendered possible by the collar 15, which extends toward the vehicle middle 16 at an angle in the direction of the cab 9, as described above. It is also apparent that, around the collar 15 of the extension portion 7, the lug 19 formed on the carrier 6 is guided in the direction of the vehicle middle 16. By way of this lug 19, the axis of rotation 24 for the hydraulic cylinder 18 can be positioned as far as possible toward the vehicle middle 16, in order to make sufficient installation length and lever arm for the hydraulic cylinder 18 available even in the transport folded position shown.

Figure 5:
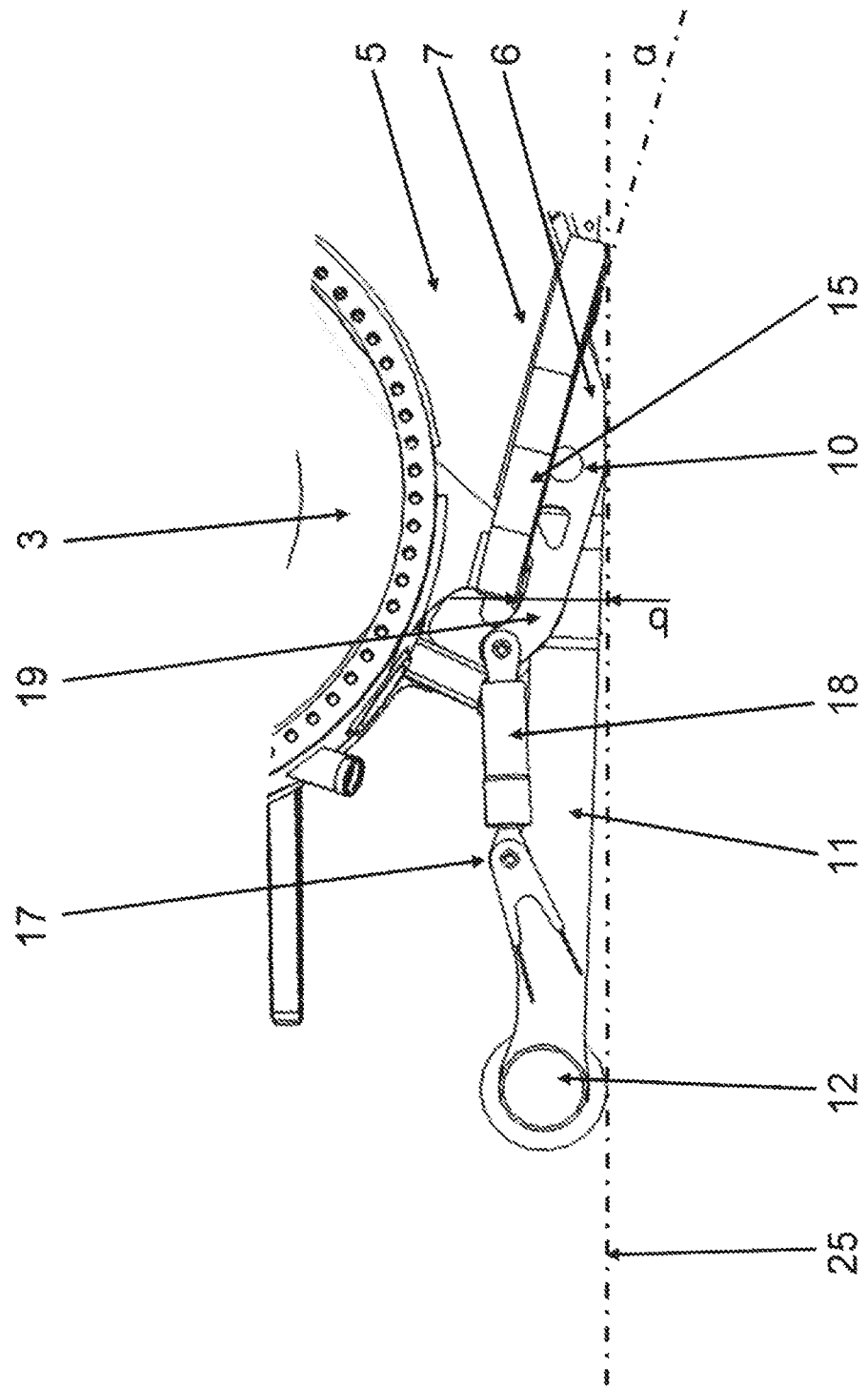
FIG. 5 shows a bird's-eye view of the frame outrigger and folding part.

FIG. 5 shows a bird's-eye view of the frame outrigger 5 and of the folding part 11 according to FIG. 4. It is apparent that the folding part 11 is located within the vehicle profile 25, indicated in a dot-dash manner, in the transport folded position shown, said vehicle profile 25 indicating the maximum permissible width of the vehicle 1. The lug 19 arranged on the carrier 6 passes around the collar 15 of the extension portion 7 in the direction of the vehicle middle 16 and thus affords sufficient lever arm and installation length for the hydraulic cylinder 18, via which the folding part 11 can be pivoted about the joint 10 from the transport folded position shown into the supporting folded position. The joint 10 between the carrier 6 and the folding part 11 is arranged in the extension portion 7 in the shown transport position of the carrier 6 such that it remains outside the extension portion 7. This is also ensured by the collar 15, which extends toward the vehicle middle 16 in the direction of the cab 8 with respect to the vehicle profile 25, such that, on a side 28 close to a cab 9, the collar 15, 15a is offset from the vehicle profile 25 in the direction of the vehicle middle 16 at least by the width b of the folding part 11, 11a. In the exemplary embodiment shown, the collar 15, 15a extends toward the vehicle middle 16 in the direction of the cab 9 at an angle α of preferably 15° with respect to the vehicle profile. This angle α is clarified by a further line indicated in a dot-dash manner. This offset of the collar 15 with respect to the longitudinal side of the vehicle profile 25 ensures that the folding part 11 is foldable forward into the transport folded position via the joint 10 in the transport position of the carrier 6 in the extension portion 7. It is also apparent from FIG. 5 that the support foot 22 on the folding part 11 is offset slightly inward toward the vehicle middle 16 in order that said support foot 22 is located within the vehicle profile in the transport folded position of the folding part 11.

Figure 6:
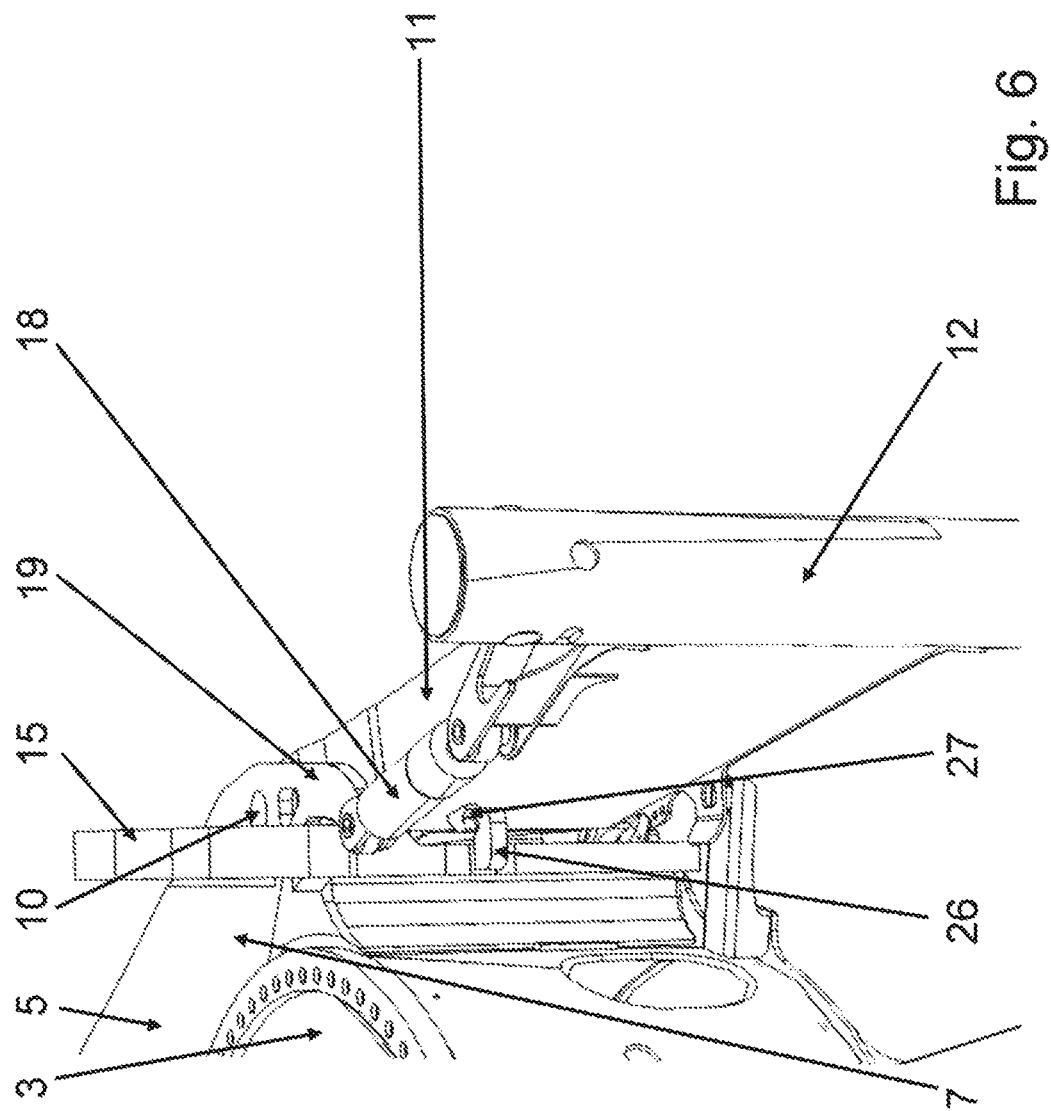
FIG. 6 shows the frame outrigger and folding part.

FIG. 6 reveals a perspective detail view of the frame outrigger 5 and of the folding part 11. In the illustrated view, it is possible to see behind the folding part 11. It is readily apparent from this illustration that the frame outrigger 5 has a latching protrusion 26, which engages in an eye 27 on the folding part 11 and thus prevents the carrier 6 from being pushed out of the extension portion 7 before the folding part 11 has been pivoted out of the transport folded position into a supporting folded position. The folding part 11 could also be secured by a locking pin.

Figure 7:
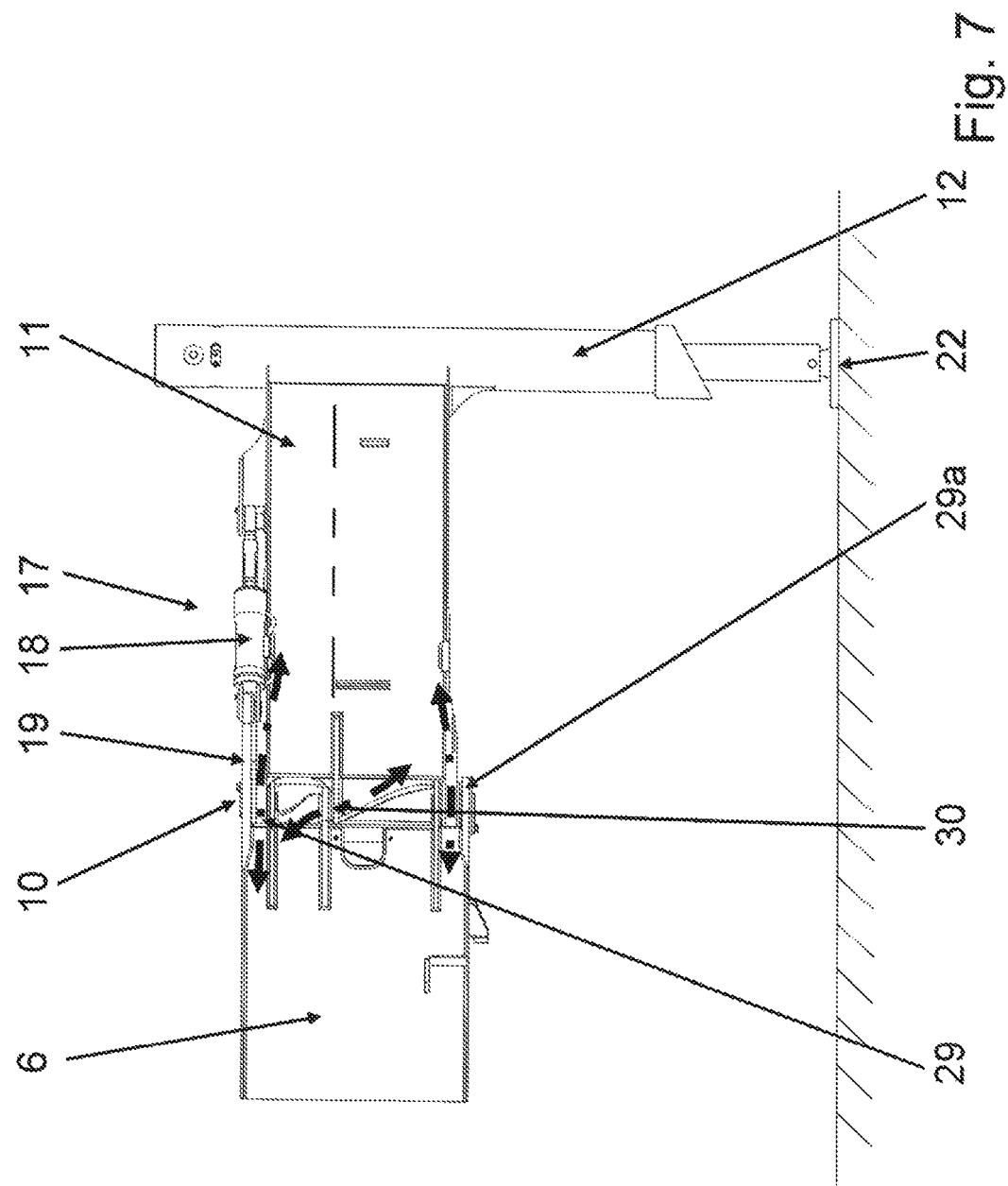
FIG. 7 shows a carrier with a folding part.

FIG. 7 shows a perspective detail view of the joint 10 between the folding part 11 and carrier 6. In the illustrated view, it is possible to see behind the folding part 11. It is readily apparent from this illustration that the joint 10 between the folding part 11 and carrier 6 has a plurality of joint components 29, 29a, 30. While the upper and lower joint component 29, 29a are configured to transmit horizontal forces, the middle joint component 30 is configured to transmit vertical forces. In FIG. 7, the forces to be transmitted are indicated as dot-dash arrows. In order to transmit horizontally acting forces, the upper 29a and the lower joint component 29 have pins. The middle joint component 30 is formed without a pin, since in this case only vertically acting forces are transmitted via bearing surfaces.

Figure 8:
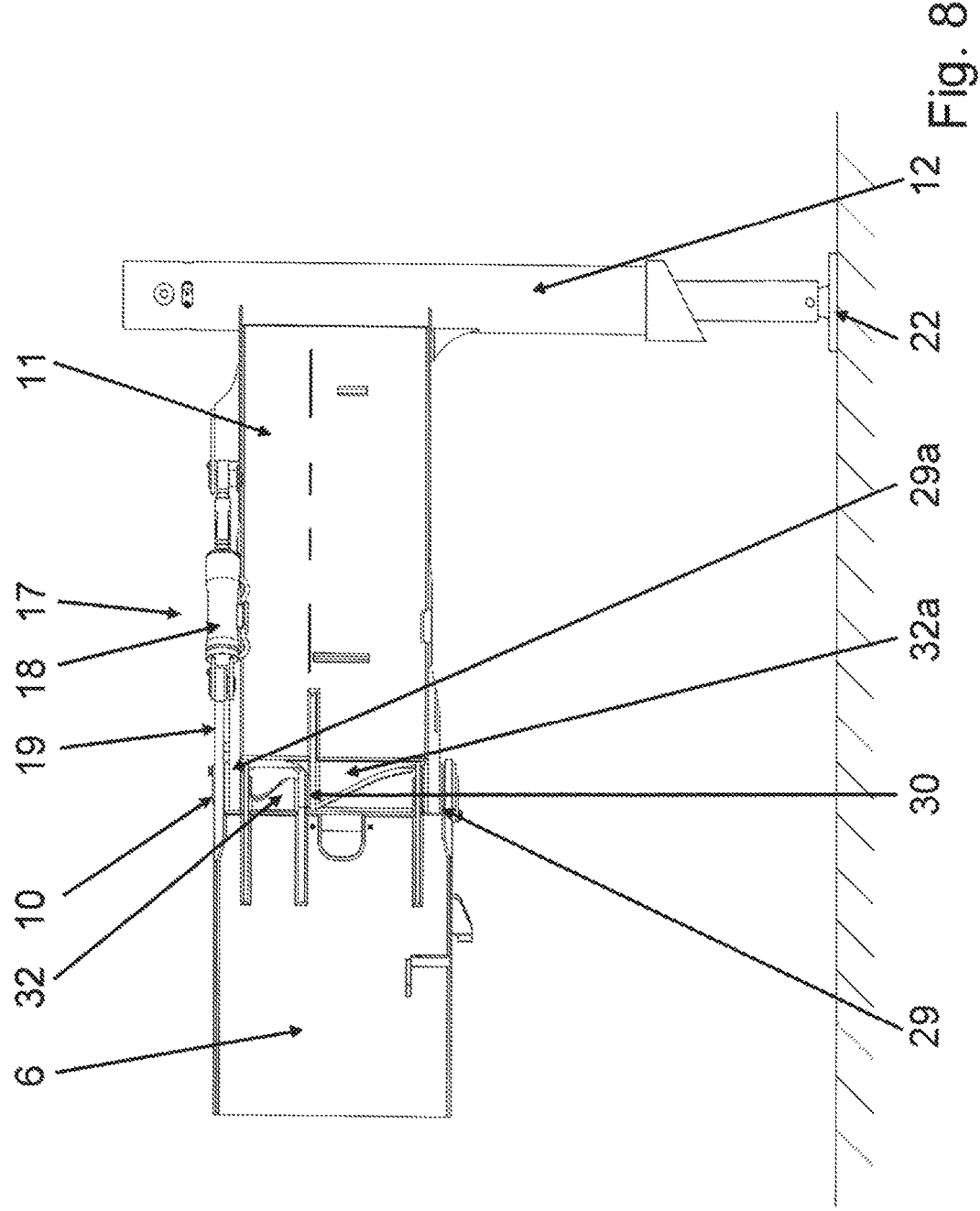
FIG. 8 shows a carrier with a folding part.

FIG. 8 shows a joint 10 between the folding part 11 and carrier 6 according to FIG. 7, but without indicated force lines. It is apparent that the middle joint component 30 comprises supporting carriers 32, 32a that taper to a point in order to support the vertical forces.

FIG. 9 reveals a joint 10 between the folding part 11 and carrier 6 according to FIGS. 7 and 8, but in this case a perspective illustration has been chosen. Furthermore, the support foot 22 of the support leg 12 has been retracted and positioned in a folded down manner by a sleeve 31 that tapers to a point.

Finally, it should also be noted that, although the drawings show a frame outrigger 5 with arcuate extension portions 7, 7a and corresponding carriers 6, 6a, the basic concept of the inventions is applicable in principle for example also to what are known as telescopic X-outriggers with straight or curved extension portions, which intersect in front of or behind the turntable, or telescopic outriggers, in which the carriers are extended perpendicularly to the vehicle side.

Of course, the invention is not limited to the illustrated exemplary embodiments. Further configurations are possible without departing from the basic concept. Thus, the vehicle can also be in the form of a truck and trailer-mounted concrete pump. Here, the cab is part of a tractor unit, wherein the frame outrigger is part of a trailer connected to the tractor unit in an articulated manner.

LIST OF REFERENCE SIGNS

1 Vehicle
2 Frame
3 Turntable
4 Boom
5 Frame outrigger
6 6a Carriers
7 7a Extension portions
8 8a Telescopes
9 Cab
10 10a Joints
11 11a Folding parts
12 12a Support legs
13 Double steering axle
14 14a Axles
15 15a Collars
16 Vehicle middle
17 17a Drives
18 18a Hydraulic cylinders
19 19a Lugs
20 Boom joints
21 Charging hopper
22 22a Support foot
23 23a Folding carrier
24 Axis of rotation (hydraulic cylinder)
25 Vehicle profile
26 Latching protrusion
27 Eye
28 Side close to cab (collar)
29 29a Joint components for horizontal forces
30 Joint component for vertical forces
31 Sleeve
32 32a Supporting carrier
33 Control hydraulics/electronics

The invention claimed is:

1. A vehicle having a vehicle profile and comprising:
   a cab;
   a frame;
   a pivotable turntable, arranged on the frame, with a boom constructed thereon; and
   a frame outrigger coupled to the frame and having:
      a first carrier and a second carrier that are retractable into the vehicle profile at a retracted transport position and extendable out of the vehicle profile,
      a first extension portion fixed to the vehicle and configured to guide the first carrier in a first telescoping arrangement,
      a second extension portion fixed to the vehicle and configured to guide the second carrier in a second telescoping arrangement,
      a first folding part connected to the first carrier via a first joint arranged at a free end of the first carrier,
      a second folding part connected to the second carrier via a second joint arranged at a free end of the second carrier,
      a first support leg arranged on the first folding part, and
      a second support leg arranged on the second folding part,
   wherein the respective joints are arranged outside the respective extension portions in the retracted transport position such that the respective folding parts are foldable laterally into the vehicle profile in a transport folded position,
   wherein the respective folding parts are foldable forward in the direction towards the cab in the transport folded position,
   wherein the first extension portion and the second extension portion are arranged behind the cab.

2. The vehicle of claim 1, further comprising:
   two or more axles positioned between the cab and the first and the second extension portions,
   wherein the respective support legs arranged on the respective folding parts are arranged between the or more two axles in the transport folded position.

3. The vehicle of claim 1, wherein the respective folding parts are pivotable out of the transport folded position into a supporting folded position before the respective carriers are extendable from the retracted transport position into an extended supporting position.

4. The vehicle of claim 3, wherein the respective folding parts are latchable in the transport folded position and/or in the supporting folded position.

5. The vehicle of claim 1, wherein the respective extension portions each have a collar, wherein the collar extends toward the vehicle middle towards the cab, such that, on a side facing the cab, the collar is offset in the direction of the vehicle middle at least by a width of the respective folding parts.

6. The vehicle of claim 1, wherein the respective folding parts are pivotable with respect to the respective carriers from the transport folded position into a supporting folded position by respective drives.

7. The vehicle of claim 6, wherein the respective drives are configured to keep the respective folding parts in the transport folded position and/or in the supporting folded position.

8. The vehicle of claim 6, wherein the respective drives each comprise a hydraulic cylinder, wherein a lug for attaching the hydraulic cylinder in an articulated manner is formed at the respective free ends of the respective carriers.

9. The vehicle of claim 8, wherein in the transport folded position of the carrier, the lug passes around the respective collars of the respective extension portions towards of the vehicle middle.

10. The vehicle of claim 1, wherein the respective folding parts are constructed in a telescopic manner.

* * * * *